Jan. 25, 1966  W. SHIPPEE  3,230,556
CONSTRUCTION FOR MAINTAINING A CONTROLLED
TEMPERATURE ENVIRONMENT IN A BED
Filed May 7, 1962  4 Sheets-Sheet 1

INVENTOR.
WINSOR SHIPPEE
BY
ATTORNEY

Jan. 25, 1966 W. SHIPPEE 3,230,556
CONSTRUCTION FOR MAINTAINING A CONTROLLED
TEMPERATURE ENVIRONMENT IN A BED
Filed May 7, 1962 4 Sheets-Sheet 2
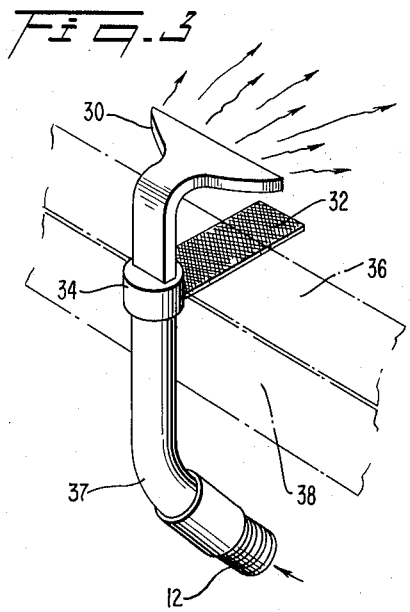
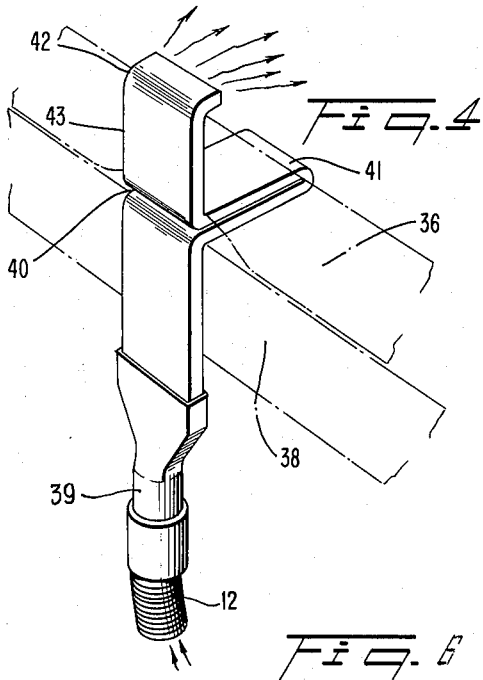
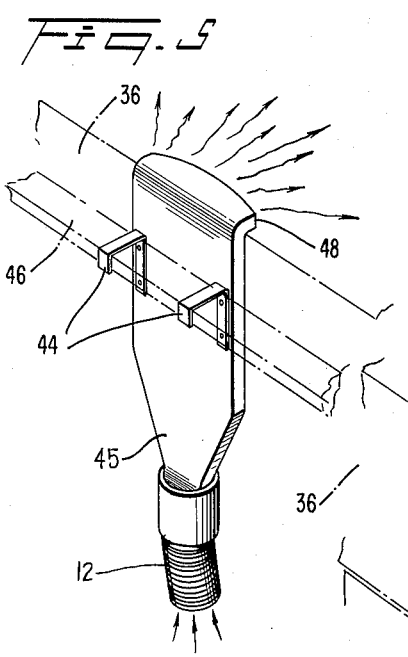
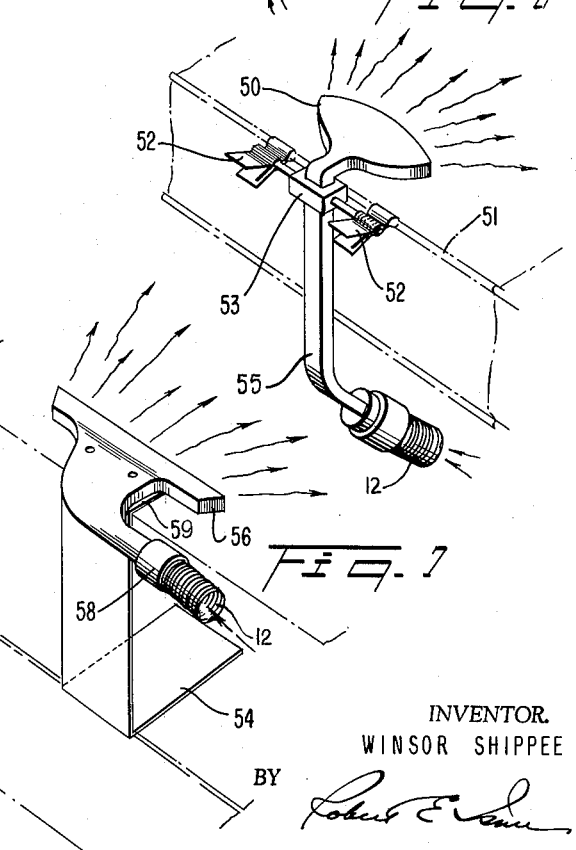
INVENTOR.
WINSOR SHIPPEE
BY
ATTORNEY Jan. 25, 1966 W. SHIPPEE 3,230,556
CONSTRUCTION FOR MAINTAINING A CONTROLLED
TEMPERATURE ENVIRONMENT IN A BED
Filed May 7, 1962 4 Sheets-Sheet 3
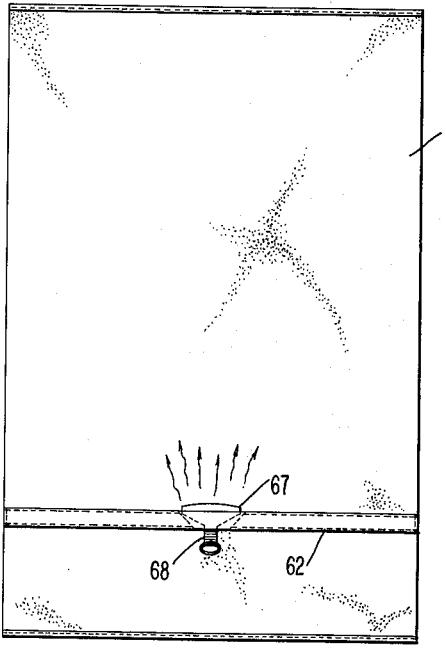
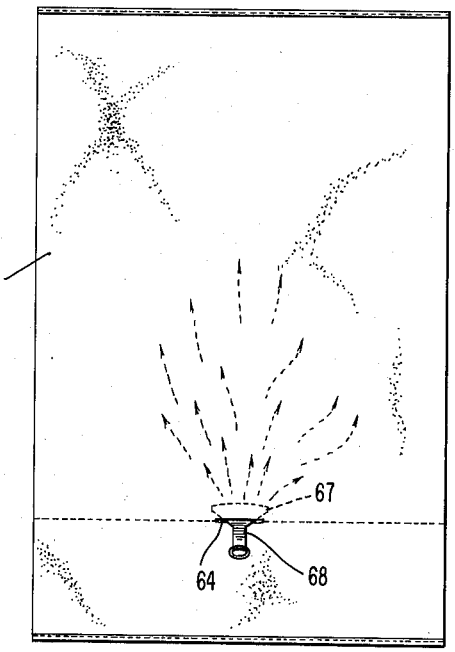
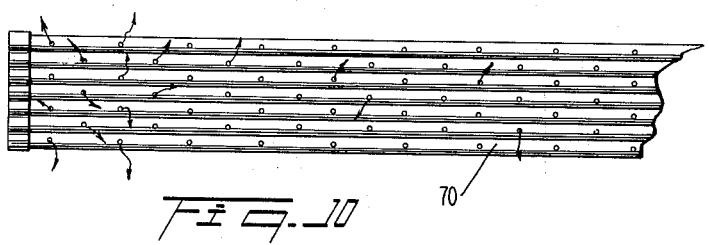
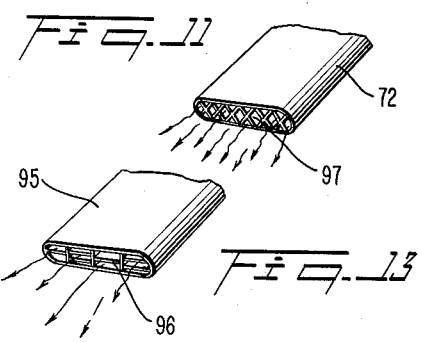
INVENTOR.
WINSOR SHIPPEE
BY
ATTORNEY

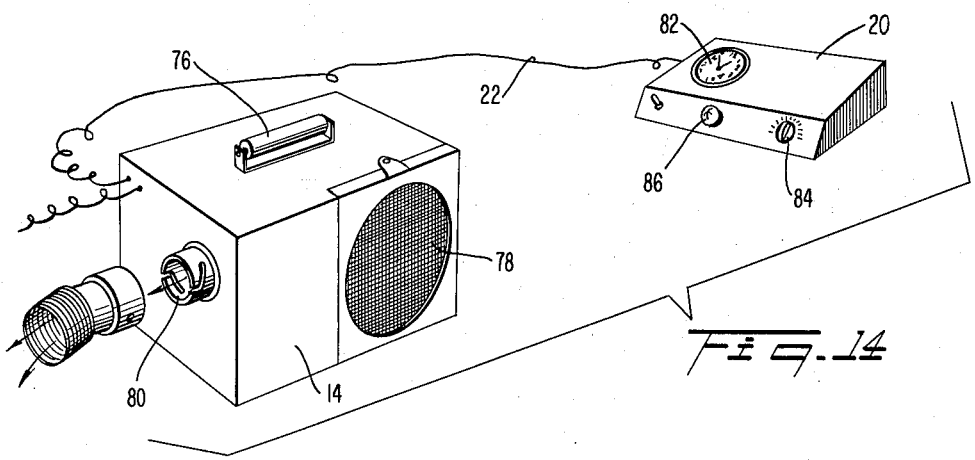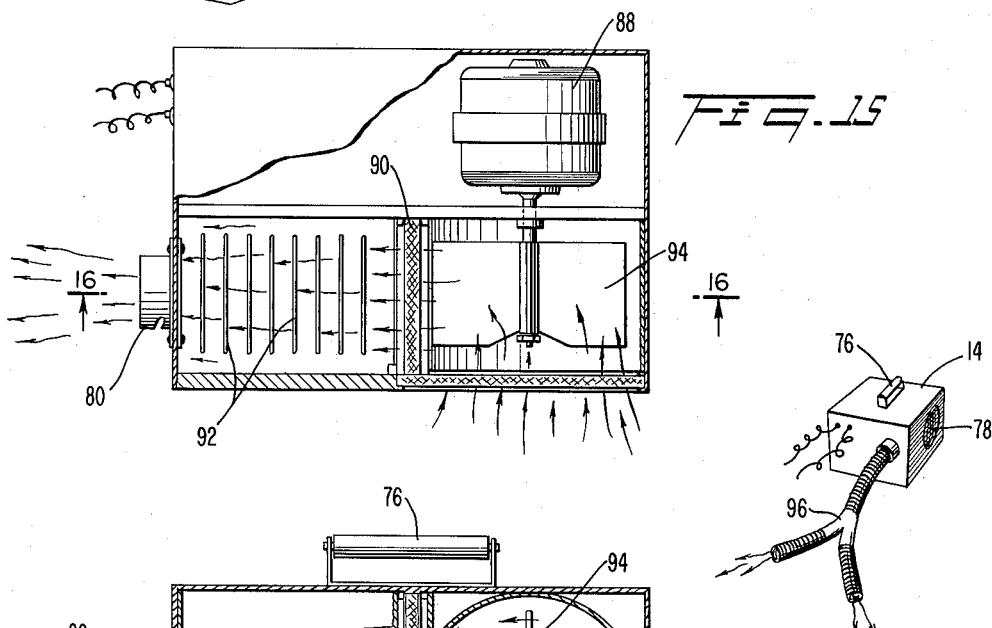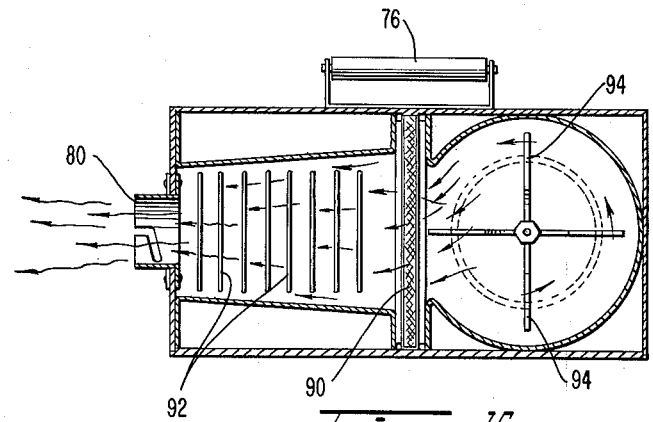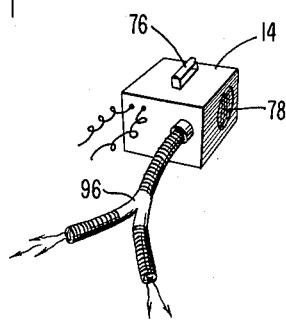
INVENTOR.
WINSOR SHIPPEE
ATTORNEY

United States Patent Office 3,230,556
Patented Jan. 25, 1966

3,230,556
CONSTRUCTION FOR MAINTAINING A CONTROLLED TEMPERATURE ENVIRONMENT IN A BED
Winsor Shippee, 30 E. 9th St., New York, N.Y.
Filed May 7, 1962, Ser. No. 192,825
1 Claim. (Cl. 5—317)

This invention relates to beds and particularly to an improved construction for maintaining a controlled temperature environment therein.

The quality of bed rest and therapeutic values resulting therefrom are largely dependent upon the degree of comfort afforded the occupant. One important factor relating thereto is the maintenance of a desired temperature immediately adjacent the occupant without an undue weight of overlying insulating material, such as sheets and blankets. A common expedient directed to achieving this desired end is the "electric" blanket which incorporates an independent heating means in an overlying layer of insulating material. Such an expedient, apart from the ever present possibility of malfunction, shock hazards, and problems attendant cleaning thereof, falls short of achieving the desired result since the desired temperature is always dependent upon the degree of conformity between the blanket and the occupant and the unavoidable presence of overlying weight.

This invention may be briefly described as an improved construction for maintaining a controlled temperature environment adjacent a bed occupant with a minimization of overlying weight of insulating material, and in its broad aspects includes the provision of a directed and filtered flow of air, controllable as to temperature and quantity, immediately adjacent a bed occupant, which not only serves to maintain a constant temperature environment suited to the occupant's needs, but also effectively reduces the weight of the overlying insulating material.

The primary object of this invention is the provision of an improved construction for maintaining a controlled temperature environment adjacent a bed occupant.

Another object of this invention is the provision of an improved construction for introducing a filtered flow of air, controllable as to temperature and quantity, immediately adjacent the body of a bed occupant.

A further object of this invention is the provision of an improved apparatus which will collect, filter, and heat air, deliver it to a bed occupant's immediate environment by means of simple and easily attachable and removable nozzles, and be controlled from the bedside as to the quantity and intensity of warm air desired.

A further object of this invention is the provision of novel means for controlling the temperature of the immediate environment of a bed occupant and to minimize the effective weight of the overlying insulating material, all to the end of increasing the degree of comfort to realize the maximum therapeutic values that are flowable from bed rest.

Other objects and advantages of the invention will be pointed out in the following specification and claim and will be apparent to those skilled in this art from the appended drawings which show, by way of example, a presently preferred construction incorporating the principles of the invention.

Referring to the drawings:

FIGURE 3 is an oblique view, on an enlarged scale, illustrating a suitable arrangement for mounting the air distributing nozzle adjacent the mattress element of a bed.

FIGURES 4, 5, 6 and 7 are oblique views, on an enlarged scale, illustrating modified mountings of the air distributing nozzle relative to the mattress elements.

FIGURES 8 and 9 are schematic plan views of an alternative way of introducing the air distributing nozzle into the immediate environment of the bed occupant.

FIGURE 10 is a schematic plan view of an alternate form of an air distributing mechanism.

FIGURES 11, 12 and 13 are oblique views of suitable air conduit members.

FIGURE 14 is an oblique schematic view of a suitable air filter, heater and blower and associated remotely located control unit.

FIGURE 15 is a plan view, partly in section, showing the constructional details of a suitable air filter, heater, and blower.

FIGURE 16 is a sectional view taken on the line 16—16 of FIGURE 15.

FIGURE 17 is a schematic view of a single source dual output arrangement.

Figure 1:
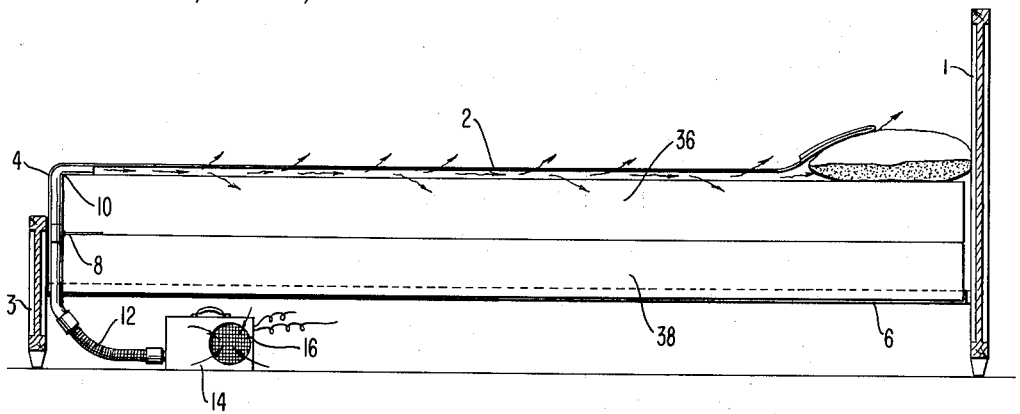
FIGURE 1 is a side view, partially in section, showing a mounting of the construction forming the subject matter of the invention herein in a bed of conventional construction.
Figure 2:
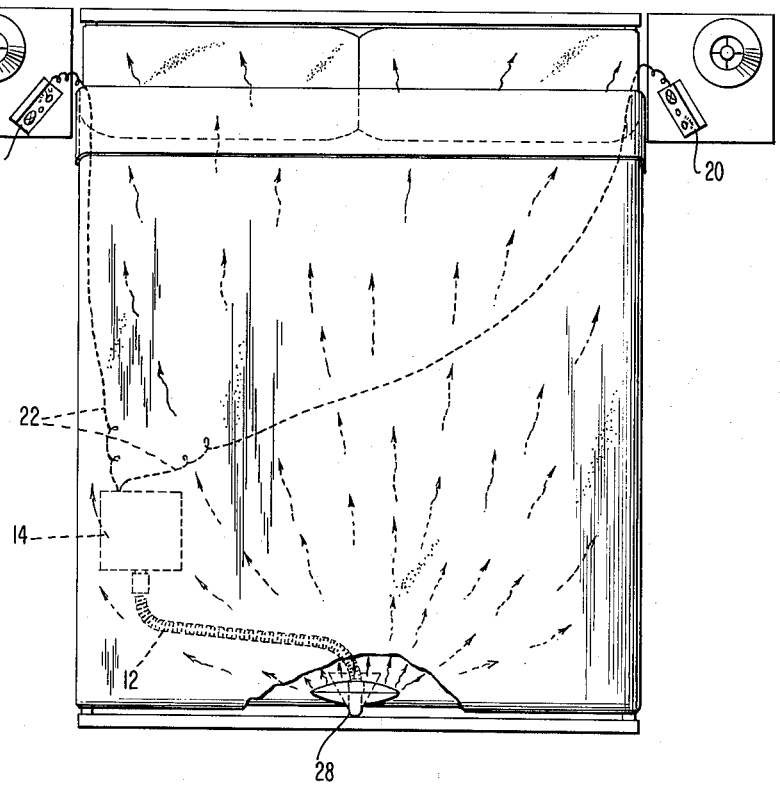
FIGURE 2 is a plan view, partially cut away, of the unit shown in FIGURE 1.

Referring to the drawings, and particularly to FIGURES 1 and 2, the subject invention is adapted to be utilized in conjunction with a bed of standard construction to provide a directed flow of air, controllable both in amount and temperature, in the immediate environment of a bed occupant. To this end, there is illustrated a bed assembly which includes a headboard 1, a footboard 3, a transversely disposed mattress support 6 supporting intermediate bed component 38 with an overlying mattress 36. As is conventional, the mattress 36 will be provided with suitable lower and upper sheets, not shown, and an overlying blanket 2, which together with the sheets, will have its peripheral portions disposed in tucked in relation intermediate the mattress 36 and next lower bed component 38 to form, intermediate said upper and lower sheets, a bed occupant receiving area. Disposed at the foot of the mattress 7 and selectively locatable along the width thereof is an air distributing nozzle 10 adapted to direct a flow of air, controllable as to temperature and amount, into the above defined bed occupant receiving area. As indicated, the nozzle is preferably shaped to provide a uniform distribution of the air and the flow thereof is such that the major portion thereof will move upward from the foot of the bed towards the headboard end and to there exit adjacent the pillow area. As also indicated, a minor portion of this air flow will permeate through the overlying sheet and blanket 2 is such are formed of permeable material and a still smaller portion will diffuse into the mattress. Both of these diffusion effects contribute, together with the main air flow, to the maintenance of a uniform temperature in the immediate environment of the bed occupant. In addition thereto, the illustrated air flow, which, as later will be described, necessarily introduced under a slight positive pressure, which pressure serves to provide a buoyant or lifting force upon the overlying blanket 2 and sheet to thereby minimize the effective weight of such insulating lamina upon the bed occupant to provide an added degree of comfort thereto.

As also generically shown in FIGURES 1 and 2, the desired air flow to and through the nozzle 10 is effected by means of a flexible conduit 12 connected to a fan and air treating unit, generally designated 14, conveniently disposed beneath the bed and containing, as will be described later, a fan for inducing the air flow, heating means for controlling the temperature of the air and suitable filtering means for cleaning the air. As best shown in FIGURE 2, the volume of air and temperature thereof introducible into the bed occupant area is remotely controllable by suitable control units 18 or 20 disposed in the vicinity of the headboard 2 for manipulation by the bed occupant.

FIGURE 3 illustrates, in an enlarged scale, a preferred construction for the air flow distributing nozzle and associated mounting means therefor. As there illustrated, the flexible conduit 12 is connected to a rigid conduit 37 forming a portion of the nozzle assembly and having the air flow distributing nozzle 10 at the terminal end thereof. The rigid conduit 37 is adapted to be disposed in abutting relation to the end of the lower bed component 38 and mattress 36 and is provided with an elongate tongue 32 suitably spaced from the nozzle portion 30 adapted to be received intermediate the mattress 36 and underlying component 38 to thereby properly position the nozzle relative to the upper surface of the mattress.

FIGURE 4 illustrates, on an enlarged scale, a modified mounting of the air distributing nozzle relative to the mattress elements adapted to facilitate the tucking in of sheets and/or blankets. As there illustrated, the flexible conduit 12 feeds into a rigid conduit 39 having the air distributing nozzle 42 at the terminal end thereof. The rigid conduit convolutes as at 41 with a vertical rise 43 from the convolution 41 of the nozzle 42. The space 40 created by the convolution 41 collaborates with the already extant space between the mattress 36 and next lower bed component 38 to permit the tucking of sheets and/or blankets therein.

FIGURE 5 illustrates, on an enlarged scale, a modified mounting of the air distributing nozzle adapted to be used when the mattress and any lower bed components are disposed within an outer bed frame. As there illustrated, the flexible conduit 12 feeds into the rigid spreading conduit 45 having the air distributing nozzle 48 at the terminal end thereof. The rigid spreading conduit 45 has thereon attached brackets as at 44 securing the rigid conduit 45 and nozzle 48 to the bed frame 46. With this mounting, sheets or blankets hang over the outside of the frame.

FIGURE 6 illustrates, on an enlarged scale, a modified mounting of the air distributing nozzle adapted to be used when attachment to the mattress welting may be desired. As there illustrated, the flexible conduit 12 feeds into the rigid conduit 55 having the air distributing nozzle 50 at the terminal end thereof and on which is attached at the elevation of the mattress welting 51 a square collar 53 having disposed on either side of it clamps 52 in the form of clothespins or utilizing a similar principle.

FIGURE 7 illustrates, in an enlarged scale, a modified mounting of the air distributing nozzle adapted to be utilized in situations where nozzle positioning on the side of the bed is desired or where multiple outlets are contemplated. As there illustrated, the flexible conduit 12 feeds into a rigid conduit 58 having the air distributing nozzle 56 at the end thereof. The rigid conduit 58 has on its underside attached a downwardly projecting L-shaped member 54 adapted as to allow the horizontal portion of the member to be inserted between the mattress 36 and next lower bed component 38.

FIGURES 3-7 also illustrate some contemplated modes of nozzle mouth form, indicating variations in the breadth and direction of heated air discharge from the narrowness of FIGURE 4 to the span of FIGURE 7. All modes of nozzle mouth form may be used interchangeably with all attachment modes shown in FIGURES 3-7.

FIGURES 8 and 9 illustrate, in schematic plan views, alternative modes of introducing the air distributing nozzle into the immediate environment of the bed occupant. These modes do not contemplate the use of clamps, brackets, or shaped members to hold the conduit to bedframe, springs, or mattress. In FIGURE 8 the flexible conduit, not shown, is attached to the rigid conduit 68 flaring into the nozzle 67. The rigid conduit 68 and nozzle 67 are held to the mattress 60, over which is commonly disposed a bottom bed sheet, by a strap 62 extending around the body of the mattress. In FIGURE 9 the flexible conduit, not shown, is attached to the rigid conduit 68 flaring into the nozzle 67. The rigid conduit 68 and the nozzle 67 are introduced to the bedspace through a transverse slit 64 in the blanket and/or upper bed sheet. As the width of the flared nozzle 67 being greater than the dimension of the transverse slit 64, the nozzle remains secured within the bedspace.

FIGURE 10 illustrates, in schematic plan view, an alternate form of an air distributing mechanism. This form as illustrated in FIGURE 10 contemplates no terminal nozzle; rather, the conduit is a multiplicity of joined delivery tubes 70 with perforations therein, the conduit being perforated for any desired length and introduced into any part of the bedspace desired.

FIGURES 11, 12 and 13 illustrate suitable air conduit members with particular reference to the cross-sectioning of the conduits either when used as in FIGURE 10 or in any other conduit arrangement contemplated. FIGURE 11 illustrates a diagonal square cross-section 97 in a flattened conduit 72, permitting an even and well distributed air flow. FIGURE 12 illustrates a multiplicity of connected parallel conduits 74, again allowing for an even and well distributed air flow which may be split at any point into any combination or combinations of conduits for delivery to nozzles at all portions of the bed and at unequal distances from one another and the source. FIGRE 13 illustrates an interior revealing a ladder-like cross-section 96 in a flattened conduit 95, enabling the combination of delivery means illustrated in FIGURE 10 with fixed nozzle delivery means. The portions of the cross-section of the conduit 95 shown as having no contact with the exterior wall of the conduit, being fully enclosed therein by other portions of the cross-section abutting on the exterior wall of the conduit, may continue to terminate in a nozzle of any type while any of the subdivisions which abut the exterior wall can be perforated in a manner such as illustrated in FIGURE 10.

FIGURE 14 is an oblique schematic view of a suitable air blower, filter, and heater and associated remotely located control unit. The blower, filter and heater unit, which may be conveniently termed the source unit, is connected by a control lead 22 to a remotely located control unit 20. Returning to FIGURE 14, the control panel 20 may be provided with a clock 82 for timed control, heat regulator 84, and fan switch 86. The exterior view of the source unit 14 illustrated in FIGURE 14 indicates a handle 76, enhancing portability of the unit, intake opening 78, and outlet opening 80 suitably slotted to receive the end of the flexible conduit 12.

As shown in FIGURES 15 and 16 the source unit includes a suitable fan type air impeller 94, a drive motor 88 therefor positioned so that the associated impeller blades 94 draw the air in through the intake opening 78 and drive it through the vertically disposed filter media 90, across heating means 92 and through the outlet duct 80.

FIGURE 17 illustrates a schematic view of a single source dual output arrangement enabling the dividing of the warm air delivery conduit at 96 with conduits destined for different parts of the bed. A further suitable modification of FIGURE 17, not shown, is a division at point 96 into three conduits with one destined for the foot area of the bed and one for each side of the bed.

Having thus described my invention, I claim:

An apparatus for creating a warm environment in the enclosed bedspace occupied by a person, such apparatus comprising a means for collecting and heating air, flexible tubing leading from the collecting and heating means to the delivery nozzle within the bedspace, such flexible tubing connecting to rigid tubing below the place where the mattress overlies the bed component next underneath the mattress, such rigid tubing convolution into the space between the mattress and bed component underneath to a distance great enough to firmly support the upward continuation of the rigid tubing which ends in a nozzle curving inwardly over the lip of the mattress into the bedspace, and means for controlling the temperature and quantity of air released to the bedspace.

References Cited by the Examiner

UNITED STATES PATENTS

| | | | |
|---|---|---|---|
| 1,936,960 | 11/1933 | Bowman | 5—347 |
| 2,097,751 | 11/1937 | Baltich | 5—347 |
| 2,493,067 | 1/1950 | Goldsmith | 5—347 X |
| 2,512,559 | 6/1950 | Williams | 5—347 |
| 2,695,413 | 11/1954 | Maat | 5—347 X |

FRANK B. SHERRY, *Primary Examiner.*